Patented July 6, 1954

2,683,093

UNITED STATES PATENT OFFICE 2,683,093

SOLVENT COMPOSITION

James Joseph Eberl, Moylan, Pa., assignor to Johnson & Johnson, a corporation of New Jersey No Drawing. Application November 28, 1951,
Serial No. 258,764

3 Claims. (Cl. 106—311)

This invention relates to improved resin casts for orthopedic use and to a process of forming the same and is concerned particularly with casts that are applied from solvent.

In the past, orthopedic casts were usually based on plaster of Paris which was mixed with water in the form of a heavy paste, applied to a body member and allowed to set, but more recently a type of bandage has become available wherein a porous web, e. g. crinoline, impregnated with particles of plaster of Paris, is dipped in water for a few seconds, then wrapped around the body member and allowed to set. Although plaster of Paris bandages are used extensively they have certain important disadvantages such as undue weight and high bulk, a high degree of X-ray opacity, and imporousness. The heavy weight and high bulk of plaster of Paris bandages are disadvantages in casts that are worn by ambulatory patients, the X-ray opacity prevents observation by the physician of callus formation and the imporousness of plaster of Paris casts prevents "breathing" of the wound or elimination of perspiration and is accordingly responsible for some of the disagreeable odor that is so often associated with casts that have been worn for long periods of time. Moreover, plaster of Paris does not reach its maximum strength during its setting process until one or two days after application and the amount of heat that is given off by the cast during its initial setting makes the cast uncomfortable to the patient.

In view of the above-mentioned disadvantages of plaster of Paris casts, bandages based on synthetic or natural resins have been under development for some time. Their use requires application by wetting of the bandage with solvent, bandaging of the patient, and evaporation of the solvent as the cast dries out and gains its strength. In the past development of this type of cast, the resins used and the type of cast desired necessitated the use of highly toxic or inflammable organic solvents. To many patients and physicians the disadvantages inherent in the use of these solvents outweighed the advantages to be gained by using casts based on materials other than plaster of Paris. In one case death of a patient was reportedly due to the action of the solvent used in application of the cast. Prior to the invention, surgical casts based on resins or polymers that would not require use of toxic or inflammable solvents were not used.

This invention provides a means of applying bandages comprising high polymers wherein there are used solvents that are substantially free of toxicity and is based upon the discovery that chlorofluoroparaffins that are liquid at normal room temperatures and that boil at temperatures between 35 and 85° C. in admixture with lower alcohol mutual solvents for ethyl cellulose and chlorofluoroparaffins, form satisfactory solvents for ethyl cellulose.

In carrying the invention into practice, fibrous material of great porosity (e. g. crinoline of wide mesh) is impregnated with ethyl cellulose so as to provide a bandage composed of a major proportion, by weight, of ethyl cellulose. The bandage is activated by wetting with a non-toxic, non-irritant solvent mixture therefor comprising a major proportion by weight of liquid chlorofluoroparaffin and a minor proportion of a lower alcohol mutual solvent for ethyl cellulose and chlorofluoroparaffin.

The amount of mutual solvent will depend to a degree upon the type of chlorofluoroparaffin, the type of alcohol and other factors. In general, sufficient alcohol is employed to produce good lamination of the bandage. At least 1% mutual solvent, based on the total weight of the solvent mixture, will generally produce strong lamination. At least 3% mutual solvent is preferred. Mutual solvent content should not be more than about 15% based on the solvent mixture. The wetted bandage is applied by wrapping it around the body member and on evaporation of the solvent a rigid, well-laminated cast results. This cast is of light weight and low bulk and exceeds in strength a cast of comparable weight made from plaster of Paris.

While any of the various available types of ethyl cellulose may be used in executing the invention, ethyl cellulose having an ethoxyl content of between 45 and 50% by weight and a viscosity of 10 centipoises or less in a solution comprising 5% ethyl cellulose in 80 parts by weight of toluene and 20 parts by weight of ethyl alcohol is preferred because this type of ethyl cellulose is most readily wetted by the solvent and requires less solvent for application. The amount of ethyl cellulose present may vary substantially but is usually in the range of 50 to 75% of the total weight of the bandage. Bandages having percentages of ethyl cellulose substantially less than 50% of the total weight produce a weak cast while those having amounts in excess of 75% produce a cast that dries too slowly. At an ethyl cellulose content near 65% bandages are obtained that have desirable high strength and a satisfactory drying time.

The fibrous material base may comprise any of the well-known web-forming fibrous materials such as cotton, rayon, linen, etc. It is preferable that the fibrous material be in the form of a fairly open woven gauze, of cheese cloth, or of tobacco cloth. The ethyl cellulose may be applied to the web in the form of an emulsion, or ethyl cellulose fibers may be interwoven with the other fibrous material. The mesh of the bandage is adjusted so that substantial strength and good porosity are obtained.

The principal component of the solvent is chlorofluoroparaffin preferably having 5 or less carbon atoms in the molecule and consisting entirely of clear liquid, and preferably itself having a boiling point in the range of 35–85° C. or, in any case, adapted to provide a mixture having a boiling point within that range when combined with a minor portion of a mutual solvent for both the chlorofluoroparaffin and the ethyl cellulose. Various chlorofluoroparaffins may be combined to produce a solvent composition that complies with the above specification and all such solvent compositions are included in the inventive concept. By way of example only, the following chlorofluoroparaffins may be utilized: 1-monochloro-2,2-difluoroethane, any trichlorotrifluoroethane, 1-monochloro-2,2-difluoropropane, 2-monochloro-3,3-difluoropropane, 1-monochloro-3,3,3-trifluoropropane, 1,2-dichloro-1,1-difluoropropane, 1,1-dichloro-3,3,3-trifluoropropane, 1,2-dichloro-1,1,2-trifluoropropane, 1,2-dichloro-3,3,3-trifluoropropane, 1,2-dichloro-1,1,2,3,3,3-hexafluoropropane, 1,1,2-trichloro-1,2-difluoropropane, 1,1,2-trichloro-1,2,3,3,3-pentafluoropropane, 1,1,2,3-tetrachloro-1,3,3,-trifluoropropane, 2-monochloro-2-monofluorobutane, 2-monochloro-3,3-difluorobutane, 2-monochloro-2,3,3-trifluorobutane, and 1,1,1-trichloro-2,2,3,3-tetrafluorobutane. In general, all chlorofluoroparaffins falling within the specifications given earlier in this description, are satisfactory solvents for ethyl cellulose provided they are used in admixture with minor proportions of lower alcohols. Among the mutual solvents, use is made preferably of ethyl alcohol but methyl or propyl alcohol or butyl alcohol and related alcohols having eight or less carbon atoms in the molecule can be used. The advantage of ethyl alcohol is its relatively low toxicity and the relatively small proportion necessary to effect satisfactory wetting of ethyl cellulose. These two factors combine to provide maximum safety for patient and physician. The amount of solvent used is preferably between 200 and 300 parts of solvent per 100 parts of ethyl cellulose, and about 250 parts of solvent per 100 parts of ethyl cellulose is most desirable. To control the amount of solvent, the materials can be accurately measured and may be placed in a sealed container, as for example a tin can in which they may be stored for use by the physician.

In order to disclose the nature of the present invention more clearly, a preferred embodiment thereof will now be described in considerable detail. It is to be understood, however, that this is done merely by way of example and solely for the purpose of illustrating by means of a specific example the basic principles which are broadly applicable to all the embodiments contemplated by the invention. In other words, the invention is not restricted in any way to the specific examples hereinafter described.

Example 1

An open mesh, gauze-type cotton cloth having from five to twenty openings to the inch in each direction was impregnated with an ethyl cellulose emulsion comprising:

| | Parts |
|---|---|
| Ethyl cellulose | 50 |
| Xylene | 84 |
| Butanol | 14 |
| Water | 99 |
| Sorbitol mono-oleate wetting agent | 2 |
| Dioctyl ester of sodium sulfosuccinic acid | 1 |

In preparing the emulsion the ethyl cellulose was first dissolved in the mixed solvent and the wetting agent then added. This solution was heated on a steam bath and added under rapid stirring to a hot aqueous solution of the sulfosuccinate. The emulsion thickened somewhat on cooling and was applied to the cloth by a spreading action as with a knife spreader. The bandage was then dried in an oven and was found to contain approximately six parts by weight of ethyl cellulose solids and approximately four parts of base cloth.

In use, the bandage was immersed in about 2½ times its weight of a solution of ninety parts of trichlorotrifluoroethane and ten parts of ethyl alcohol. The bandage was then wound around a body member and allowed to set, preferably by directing thereon a warm air blower across the surface thereof. The bandage hardened substantially in less than one-half hour and was completely dried in about three hours. No irritation to the skin of the patient was found.

While in the above example the ethyl cellulose was applied in the form of an emulsion, it may be applied with good results by other methods such as by solvent or hot melt coating. The solvent mixture used may be composed of any chlorofluoroparaffin, and particularly of any of those listed earlier in this specification, and may comprise any lower alcohol as above defined provided the boiling point of the resulting solvent mixture is in the range of 35–85° C. 3–15% of the mutual solvent and the remainder chlorofluoroparaffin are preferred in the solvent composition. The casts may be canned in the solvent or stored separately from the solvent and wetted thereby immediately prior to application.

Example 2

An ethyl cellulose bandage of the type utilized in Example 1 was immersed in about 2½ times its weight of a solution of 80 parts of trichlorotrifluoroethane, 18.5 parts trichlorofluoromethane, and 1.5 parts ethyl alcohol. The bandage was then wound around a form simulating a body member and allowed to set at room temperature. The fully dried cast formed was found to be very well laminated and could be delaminated only by application of an excessive degree of force to the outside end of the bandage.

Example 3

An ethyl cellulose impregnated bandage of the type prepared in Example 1 was immersed in a solution of 98.5 parts trichlorotrifluoroethane and 1.5 parts ethyl alcohol. The bandage was then wound around a form simulating a body member and allowed to set at room temperature. The cast was found to be very well laminated and could be delaminated only by the use of excessive force applied to the outside end of the bandage.

The foregoing examples illustrate use of solvents of the present invention for activating ethyl cellulose bandage. The following examples are offered as being illustrative of solvent composi-

Example 4

Ethyl cellulose of the type described in Example 1 was immersed in 2½ times its weight of 80 parts trichlorotrifluoroethane and 20 parts of ethyl alcohol. The bandage was then wound around a form simulating a body member and allowed to set. When the bandage was completely dry, it was delaminated by force exerted on the outward end. It was found that only a moderate force would delaminate the bandage, and accordingly that the bandage was unsatisfactory.

Example 5

Example 4 was repeated except that a solvent consiting of 80 parts trichlorotrifluoroethane and 20 parts trichlorofluoromethane was used. The completely set bandage was found to delaminate by application of only moderate force on the outward end and was therefore unsatisfactory.

Example 6

Example 4 was repeated except that a solvent composition consisting of 100% trichlorotrifluoroethane was employed. The completely set bandage was found to be unlaminated and hence was completely unsatisfactory.

In the first few minutes of drying, plaster casts have greater strength than comparable resin casts of the type disclosed in the invention, but as drying proceeds the resin casts of the invention gain strength more rapidly than plaster casts and exceed the latter materially in strength. Tests indicate that after about 3½ hours of drying time, casts prepared according to the invention are highly superior in strength to plaster of Paris casts of the same weight. Resin casts having three to four times the strength of comparable plaster casts were obtained in accordance with this invention. Much lighter casts attain strength equal to that of the heavier plaster casts. Moreover, the cast of the present invention is not only lighter in weight but also highly permeable to air and its use permits ready escape of perspiration from the body member in the cast.

This application is a continuation-in-part of applications Serial No. 788,970, filed November 29, 1947, and now Patent 2,582,242, and Serial No. 88,885, filed April 21, 1949, and now abandoned.

All embodiments within the scope of this specification and/or the appended claims are comprehended in the invention. Many modifications may be made without departing from the spirit and scope of the invention. All variations and modifications are to be understood as included within the scope of the following claims.

I claim:

1. A non-irritating solvent composition for plasticizing ethyl cellulose-containing fibrous cast material consisting entirely of clear liquid for external application to the body comprising a major proportion, at least 85% by weight, of chlorofluoroparaffin having 2 or less carbon atoms in the molecule and a boiling point in the range 35–85° C., and a minor proportion 1–15% by weight, of a lower aliphatic alcohol, said alcohol being a mutual solvent for said chlorofluoroparaffin and for ethyl cellulose.

2. A non-irritating solvent composition for plasticizing ethyl cellulose-containing fibrous cast material consisting entirely of clear liquid for external application to the body comprising a major proportion, at least 85% by weight, of chlorofluoroparaffin having 2 or less carbon atoms in the molecule and a boiling point in the range 35–85° C., and a minor proportion, 3–15% by weight, of a lower aliphatic alcohol, said alcohol being a mutual solvent for said chlorofluoroparaffin and for ethyl cellulose.

3. A non-irritating solvent composition for plasticizing ethyl cellulose-containing fibrous cast material consisting entirely of clear liquid for external application to the body comprising a major proportion, at least 85% by weight, of chlorofluoroparaffin having 2 or less carbon atoms in the molecule and a boiling point in the range 35–85° C., and a minor proportion, 1–15% by weight, of ethyl alcohol.

References Cited in the file of this patent

UNITED STATES PATENTS

| Number | Name | Date |
|---|---|---|
| 2,254,469 | Bjorksten | Sept. 2, 1941 |
| 2,582,242 | Eberl | Jan. 15, 1952 |